United States Patent
De Nichilo

(10) Patent No.: US 6,863,347 B2
(45) Date of Patent: Mar. 8, 2005

(54) PIVOTABLE SEAT ASSEMBLY

(75) Inventor: Giovanni De Nichilo, Grugliosco (IT)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/445,619

(22) Filed: May 27, 2003

(65) Prior Publication Data

US 2004/0239169 A1 Dec. 2, 2004

(51) Int. Cl.[7] .................................................. B60N 2/02
(52) U.S. Cl. ........................ 297/378.12; 297/361.1
(58) Field of Search .................. 297/378.12, 378.11, 297/378.1, 361.1, 354.12; 16/231, 235, 319, 354

(56) References Cited

U.S. PATENT DOCUMENTS

| | | | |
|---|---|---|---|
| 4,076,309 A | * 2/1978 | Chekirda et al. | 297/363 |
| 4,082,352 A | * 4/1978 | Bales et al. | 297/364 |
| 4,305,615 A | * 12/1981 | Osterhold | 297/378.11 |
| 4,365,838 A | * 12/1982 | Berg | 297/378.11 |
| 4,402,547 A | 9/1983 | Weston et al. | |
| 4,707,010 A | 11/1987 | Croft et al. | |
| 5,100,202 A | 3/1992 | Hughes | |
| 5,248,184 A | 9/1993 | Morris | |
| 5,577,805 A | * 11/1996 | Glinter et al. | 297/378.12 |
| 5,611,600 A | * 3/1997 | Busch et al. | 297/378.12 |
| 5,673,971 A | * 10/1997 | Wieclawski | 297/378.11 |
| 5,690,386 A | 11/1997 | Chabanne | |
| 5,842,744 A | * 12/1998 | Harmon | 297/378.11 |
| 5,882,080 A | 3/1999 | Houghtaling et al. | |
| 5,904,403 A | * 5/1999 | Unckrich | 297/378.12 |
| 5,951,108 A | * 9/1999 | Bauer et al. | 297/378.12 |
| 6,076,890 A | * 6/2000 | Yoshida et al. | 297/378.12 |
| 6,109,690 A | 8/2000 | Wu et al. | |
| 6,139,105 A | * 10/2000 | Morgos et al. | 297/378.12 |
| 6,152,533 A | * 11/2000 | Smuk | 297/341 |
| 6,199,953 B1 | * 3/2001 | Chen | 297/367 |
| 6,328,381 B1 | * 12/2001 | Smuk | 297/365 |
| 6,409,263 B1 | 6/2002 | Seibold | |
| 6,450,580 B1 | * 9/2002 | Drew et al. | 297/378.12 |
| 6,454,355 B2 | * 9/2002 | Biletskiy | 297/378.12 |
| 6,523,899 B1 | * 2/2003 | Tame | 297/331 |
| 6,739,668 B2 | * 5/2004 | Coman et al. | 297/378.12 |
| 2002/0125757 A1 | * 9/2002 | LeTournoux | 297/378.12 |
| 2004/0036339 A1 | * 2/2004 | Christoffel et al. | 297/367 |

* cited by examiner

*Primary Examiner*—Milton Nelson, Jr.
(74) *Attorney, Agent, or Firm*—Bill C. Panagos

(57) ABSTRACT

A seat assembly having a pivot mechanism connected to a seat back and a seat bottom. The pivot mechanism has a first axis of rotation and a second axis of rotation. The pivot mechanism includes a latch rotatable about the first axis of rotation between a latched position and an unlatched position. The seat back can pivot about the first axis of rotation between an upright position and a reclined position when the latch is in the latched position. The seat back can pivot about the second axis of rotation between the upright position and a folded position when the latch is in the unlatched position.

19 Claims, 3 Drawing Sheets

PIVOTABLE SEAT ASSEMBLY

BACKGROUND OF THE INVENTION

1. Field of the Invention

The present invention relates to a seat assembly having a pivot mechanism for moving a seat back relative to a seat bottom.

2. Background Art

Seat assemblies, such as those used in motor vehicles, incorporate pivot mechanisms that allow a seat back to pivot relative to a seat bottom. A single-axis pivot mechanism that allows the seat back to be folded forward or reclined backward is often employed. Multi-axis pivot mechanisms that include a rotatable latch and separate pivot points for reclining and folding the seat back are also used. Known pivot mechanisms are large and protrude toward the front of the seat assembly, interfering with ingress and egress from the vehicle and reducing occupant comfort. In addition, these pivot mechanisms are designed for use with a specific seat back and are incompatible with other seat back or seat frame designs.

SUMMARY OF THE INVENTION

According to one aspect of the present invention, a seat assembly having a seat back, a seat bottom, and a pivot mechanism is provided. The pivot mechanism connects the seat back and the seat bottom and has first and second axes of rotation. A latch is rotatable about the first axis of rotation between a latched position and an unlatched position. The seat back is pivotable about the first axis of rotation between an upright position and a reclined position when the latch is in the latched position. The seat back is pivotable about the second axis of rotation between the upright position and a folded position when the latch is in the unlatched position.

The pivot mechanism may include a first bracket connected to the seat bottom, a recliner mechanism connected to the seat back, and a second bracket fixedly connected to the recliner mechanism and pivotably connected to the first bracket. The first bracket may include a pivot stop that is engaged by the latch when the latch is in the latched position. The second bracket may include a notch that is engageable with the pivot stop for inhibiting rotation of the second bracket.

The assembly may further include a spring for biasing the latch toward the latched position. Moreover, a cable may be connected to the latch for disengaging the latch.

DETAILED DESCRIPTION OF THE PREFERRED EMBODIMENT(S)

Figure 1:
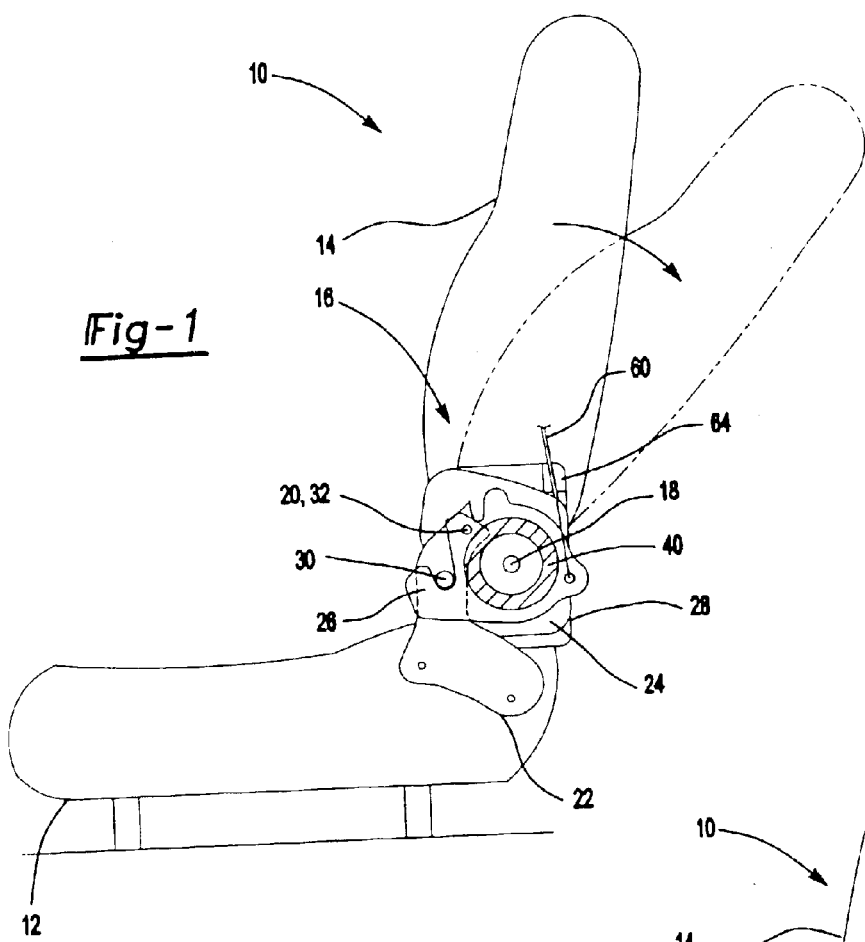
FIG. 1 is a side view of a seat assembly with a seat back in an upright position and a latch in a latched position

FIG. 1 shows a seat assembly 10 having a seat bottom 12 and a seat back 14. The seat bottom 12 may be attached to a vehicle floor and/or to seat adjuster mechanisms that enable lateral and/or vertical movement of the seat bottom 12 with respect to vehicle floor. The seat bottom 12 and the seat back 14 are connected by a pivot mechanism 16, such as a dumplatch mechanism, that allows the seat back 14 to pivot with respect to the seat bottom 12. Two pivot mechanisms 16 may be disposed on opposite sides of the seat assembly 10 to facilitate pivoting of the seat back 14.

Figure 2:
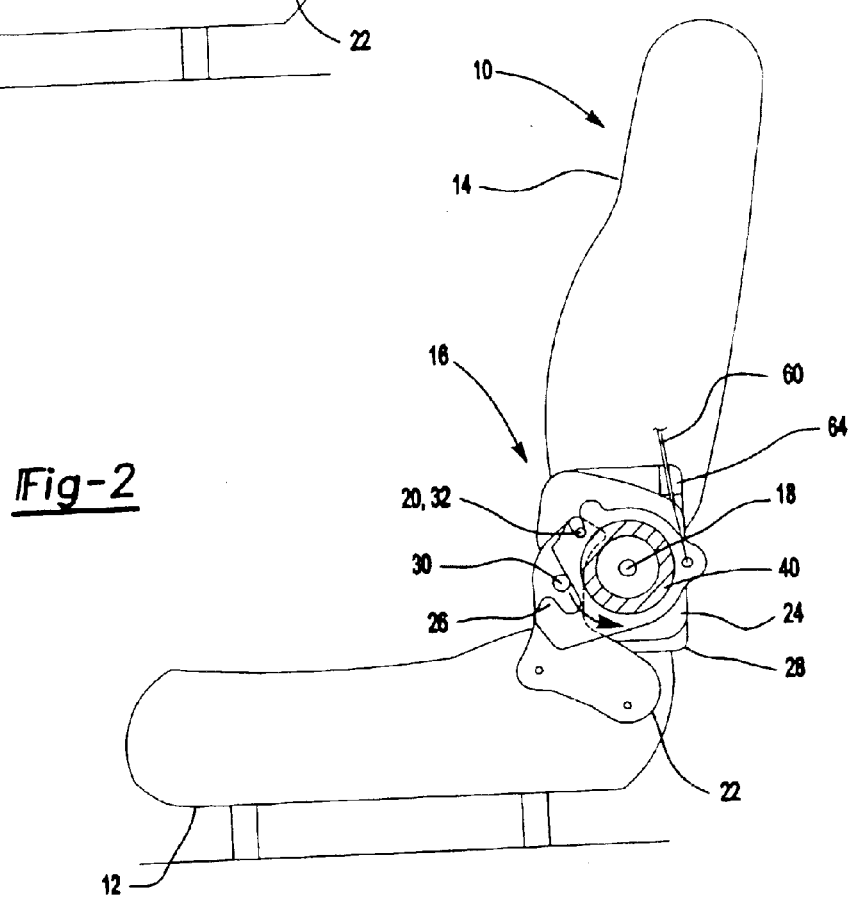
FIG. 2 is a side view of the seat assembly with the seat back in the upright position and the latch in an unlatched position.

The pivot mechanism 16 is configured to enable the seat back 14 to pivot about a first axis of rotation 18 between an upright position shown in FIGS. 1 and 2 and a reclined position shown in phantom lines in FIG. 1. The pivot mechanism 16 is further configured to enable the seat back 14 to pivot about a second axis of rotation 20 between the upright position and a folded position, shown in FIG. 3, in which the seat back 14 faces toward the seat bottom 12.

The pivot mechanism 16 may have any suitable configuration for enabling movement of the seat back 14 as described above in detail. In the embodiment shown in FIGS. 1–5, for example, the pivot mechanism 16 includes a first bracket 22 connected to the seat bottom 12, a second bracket 24 pivotally connected to the first bracket 22, a rotatable latch 26 connected to the second bracket 24, and a recliner mechanism 28 attached to the second bracket 24 and the seat back 14.

Figure 5:
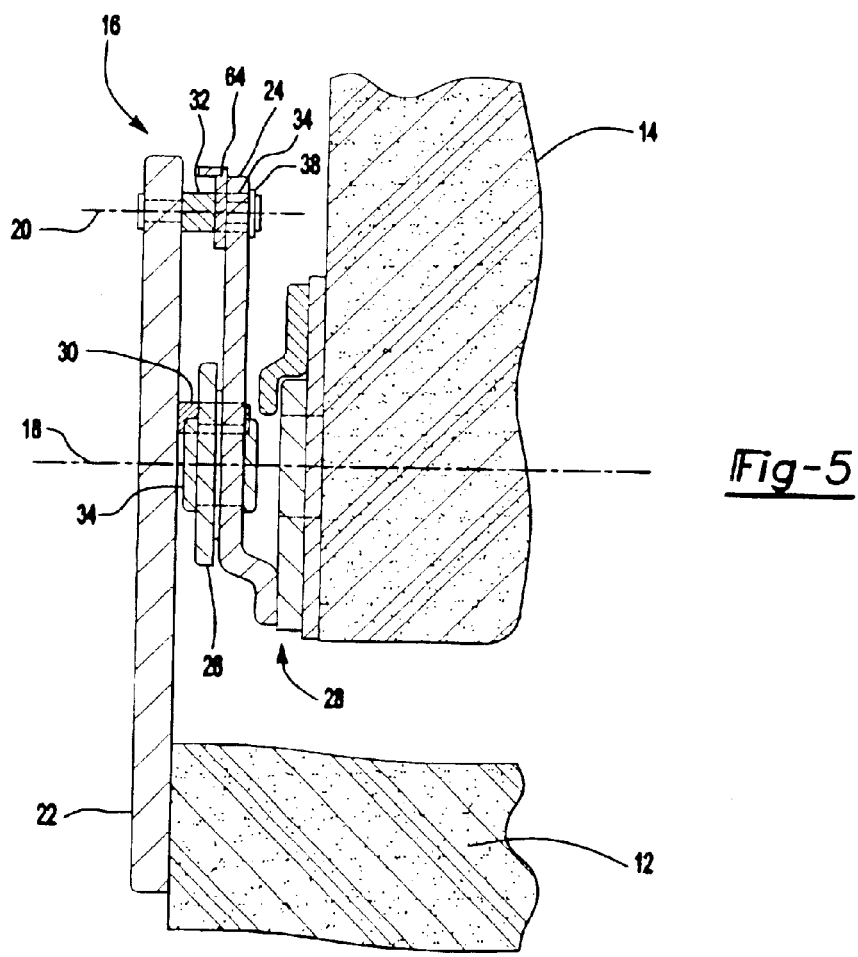
FIG. 5 is a section view of a portion of the seat assembly located near the pivot mechanism.
Figure 4:
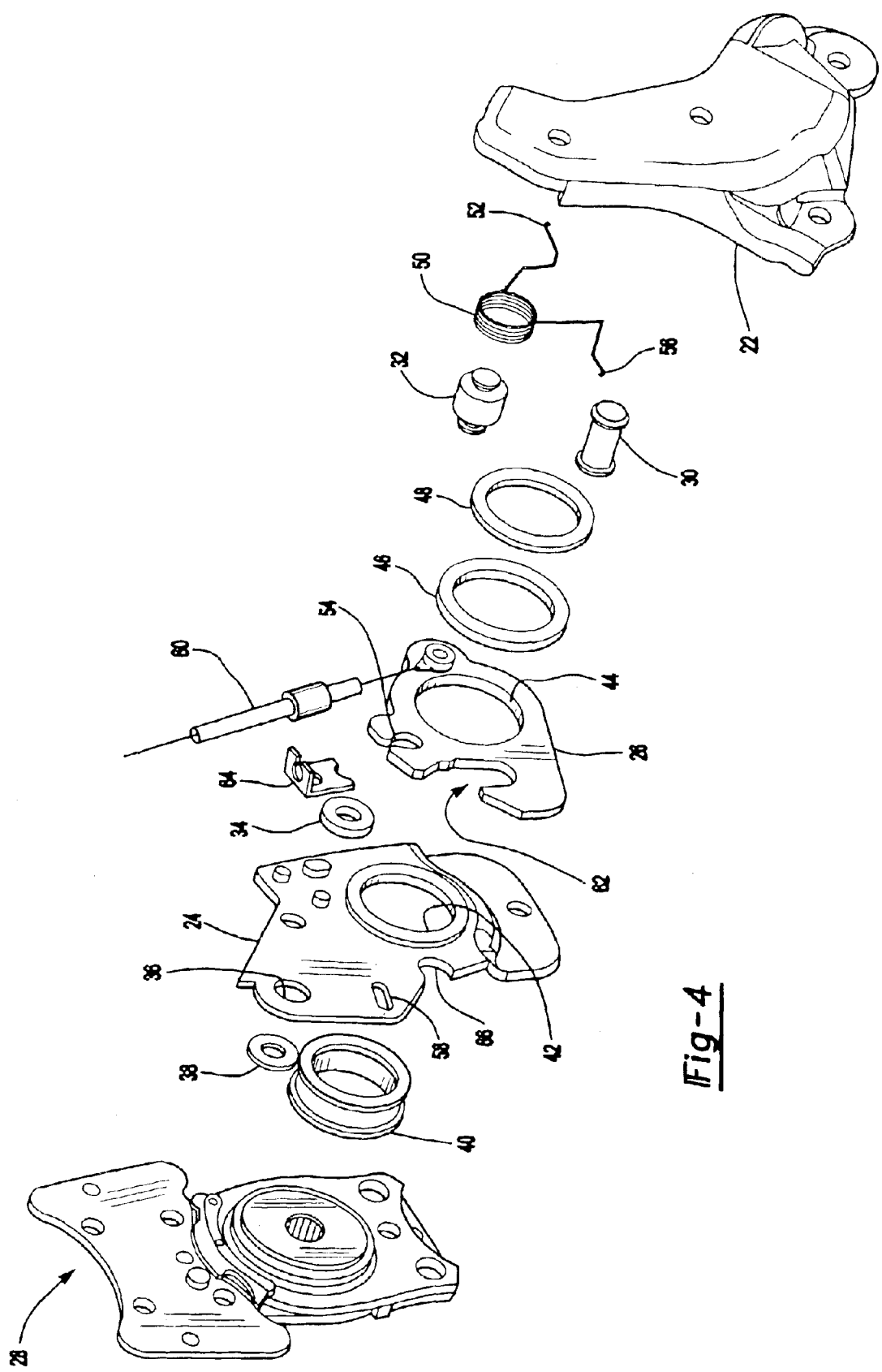
FIG. 4 is an exploded view of a pivot mechanism.

The first bracket 22 may be connected to the seat bottom 12 in any suitable manner, such as using fasteners, welding, or the like. Referring to FIGS. 4 and 5, a pivot stop 30 and a pivot pin 32 are disposed on the first bracket 22. The pivot pin 32 connects the first bracket 22 to the second bracket 24, and allows the second bracket 24 to pivot with respect to the first bracket 22 about the second axis 20. A bushing 34 may be disposed between the pivot pin 32 and a first aperture 36 in the second bracket 24 to facilitate pivoting of the second bracket 24. A fastener 38, such as a washer or snap ring, may be used to secure the pivot pin 32 to the second bracket 24.

The second bracket 24 is rotatably connected to the latch 26 by a retainer ring 40. The retainer ring 40 is inserted through a second aperture 42 in the second bracket 24 and a latch aperture 44. The retainer ring 40 has flanged ends that retain the latch 26 and the second bracket 24. Optionally, a bushing 46 may be disposed in the latch aperture 44 to facilitate rotation of the latch 26, and a washer 48 may be positioned adjacent to the bushing 46.

The latch 26 is moveable between a latched position shown in FIG. 1 and an unlatched position shown in FIG. 2. Referring to FIG. 4, the pivot mechanism 16 may include a spring 50 for biasing the latch 26 toward the latched position. The spring 50 is disposed around the pivot pin 32 and includes a first end 52 that engages the latch 26 at a latch notch 54, and a second end 56 that engages a slot 58 in the second bracket 24. A cable 60 may also be connected to the latch 26 for moving the latch to the unlatched position. When the cable 60 is actuated, such as by a release lever (not shown), the cable 60 overcomes the biasing force of the spring 50, and allows the latch 26 to be rotated with respect to the second bracket 24 from the latched position to the unlatched position. In the embodiment shown in FIG. 4, the latch 26 includes a hook portion 62 that engages the pivot stop 30 when the latch 26 is in the latched position. A clip 64 may also be attached to the second bracket 24 to secure the cable 60.

The recliner mechanism 28 may be fixedly attached to the second bracket 24 in any suitable manner, such as with fasteners, welding, or the like. In the embodiment shown in the figures, the second bracket 24 is connected to the recliner mechanism 28 near the bottom of the seat back 14. The recliner mechanism 28 is attached to the seat back 14 and is configured to allow the seat back 14 to pivot about the first axis 18 between the upright position and the reclined position.

Referring to FIG. 5, the recliner mechanism 28 and the latch 26 are positioned along the first axis 18, and the pivot pin 32 is positioned along the second axis 20. By positioning the recliner mechanism 28 and the latch 26 on the same axis of rotation, the pivot mechanism 16 has a compact configuration that can be used with a variety of seat backs and seat frames.

Figure 3:
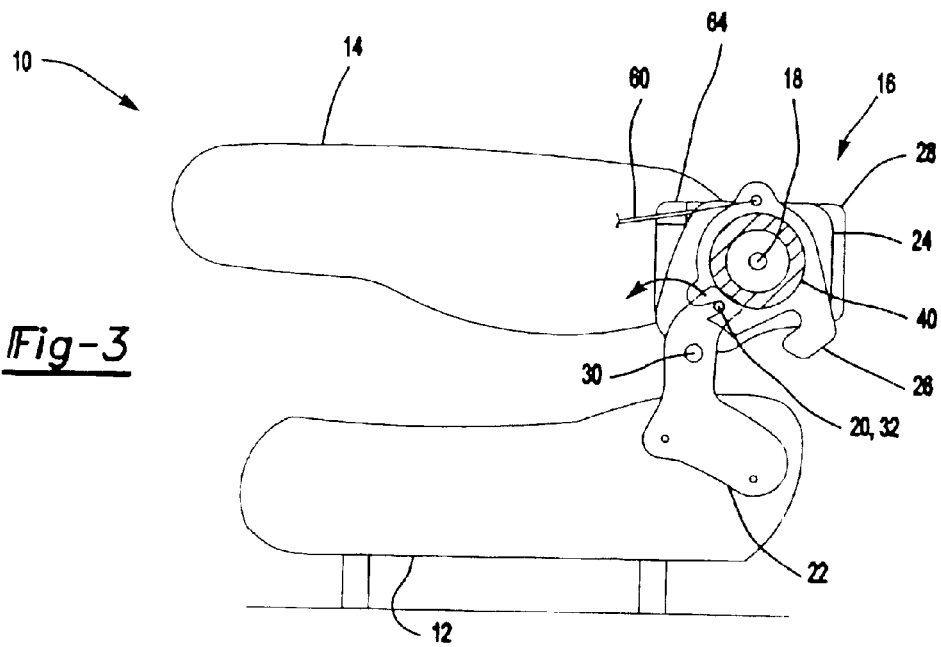
FIG. 3 is a side view of the seat assembly with the seat back in a folded position and the latch in the unlatched position.

Referring to FIGS. 1–3, the operation of the seat assembly 10 will now be described. In FIG. 1, the seat back 14 is shown in the upright position with the latch 26 in the latched position. When in the latched position, the latch 26 engages the pivot stop 30. A notch 66 in the second bracket 24 also engages the pivot stop 30 to prevent the seat back 14 from folding forward. The pivot stop 30 may be configured with a shorter length such that the pivot stop 30 is engaged by the latch 26 but not the second bracket 24. With this configuration, the seat back 14 can be pivoted by the recliner mechanism 28 about the first axis of rotation 18 between the upright position and the reclined position in the direction shown by the arrow.

Referring to FIG. 2, the seat back 14 is shown in the upright position and the latch 26 is shown in the unlatched position. The latch 26 rotates about the first axis of rotation 18 in the direction shown by the arrow when the cable 60 is actuated to cause the hook portion 62 of the latch 26 to disengage from the pivot stop 30. The seat back 14 is then free to rotate about the second axis of rotation 20.

Referring to FIG. 3, the seat back 14 is shown in the folded position. Specifically, the seat back 14 is pivoted about the pivot pin 32 and folded toward the seat bottom 12 in the direction shown by the arrow. The seat back 14 may be returned to the upright position by moving the seat back 14 away from the seat bottom 12 and allowing the latch 26 to reengage the pivot stop 30.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
    a seat back;
    a seat bottom;
    a pivot mechanism connected to the seat back and the seat bottom, the pivot mechanism including a first axis of rotation and a second axis of rotation that is different than the first axis of rotation, the pivot mechanism further including a latch that is rotatable about the first axis of rotation between a latched position and an unlatched position, wherein the pivot mechanism is configured to allow the seat back to pivot about the first axis of rotation and with respect to the seat bottom between an upright position and a reclined position when the latch is in the latched position, and wherein the pivot mechanism is further configured to allow the seat back to pivot about the second axis of rotation and with respect to the seat bottom between the upright position and a folded position when the latch is in the unlatched position.

2. The seat assembly of claim 1 further comprising a spring for biasing the latch toward the latched position.

3. The seat assembly of claim 1 wherein the pivot mechanism includes a recliner mechanism disposed on the seat back and configured to allow the seat back to pivot about the first axis of rotation.

4. The seat assembly of claim 3 wherein the pivot mechanism further comprises a first bracket connected to the seat bottom and a second bracket fixedly connected to the recliner mechanism and pivotally connected to the first bracket such that the second bracket is pivotal about the second axis of rotation.

5. The seat assembly of claim 4 wherein the second bracket is pivotally connected to the first bracket by a pivot pin.

6. The seat assembly of claim 4 wherein the first bracket includes a pivot stop and the latch engages the pivot stop when the latch is in the latched position.

7. The seat assembly of claim 6 wherein the second bracket further comprises a notch that is engageable with the pivot stop for inhibiting the second bracket from rotating about the second axis of rotation.

8. The seat assembly of claim 6 further comprising a cable connected to the latch for disengaging the latch from the pivot stop.

9. The seat assembly of claim 1 wherein the second axis of rotation is located above the first axis of rotation.

10. A seat assembly for use with a vehicle, the seat assembly comprising:
    a seat back disposed proximate the seat bottom;
    a seat bottom configured to be mounted to the vehicle;
    a first bracket disposed on the seat bottom and having a pivot stop;
    a second bracket pivotally connected to the first bracket;
    a recliner mechanism disposed between the seat back and the second bracket; and
    a latch rotatably disposed on the second bracket and engageable with the pivot stop, the latch and the recliner mechanism having a common axis of rotation;
    wherein when the latch is engaged with the pivot stop, the recliner mechanism is operative to pivot the seat back between an upright position and a reclined position, and wherein when the latch is disengaged from the pivot stop, the second bracket is allowed to pivot with respect to the first bracket to pivot the seat back between the upright position and a folded position.

11. The seat assembly of claim 10 wherein the second bracket is pivotally connected to the first bracket by a pivot pin.

12. The seat assembly of claim 11 wherein the common axis of rotation is positioned below the pivot pin.

13. The seat assembly of claim 10 wherein the latch further comprises a hook portion for engaging the pivot stop.

14. The seat assembly of claim 13 wherein the hook portion extends in front of the common axis of rotation when the hook portion engages the pivot stop.

15. The seat assembly of claim 10 further comprising a spring for biasing the latch toward the pivot stop.

16. The seat assembly of claim 10 further comprising a cable that disengages the latch from the pivot stop when actuated.

17. The seat assembly of claim 10 wherein the second bracket further comprises a notch that engages the pivot stop when the seat back is in the upright position.

18. The seat assembly of claim 10 further comprising a retainer ring that rotatably connects the latch and the second bracket.

19. The seat assembly of claim 10 wherein the common axis of rotation is positioned above the seat bottom.

* * * * *